(12) United States Patent
Watanabe (10) Patent No.: US 11,037,288 B2
(45) Date of Patent: Jun. 15, 2021

(54) VISUAL INSPECTION DEVICE AND VISUAL INSPECTION METHOD

(71) Applicant: Seiko Epson Corporation, Tokyo (JP)

(72) Inventor: Ryoki Watanabe, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/724,543

(22) Filed: Dec. 23, 2019

(65) Prior Publication Data
US 2020/0202512 A1 Jun. 25, 2020

(30) Foreign Application Priority Data
Dec. 25, 2018 (JP) .............................. JP2018-240834

(51) Int. Cl.
*G06T 7/00* (2017.01)
*G01N 21/31* (2006.01)
*G06T 5/00* (2006.01)

(52) U.S. Cl.
CPC ........... *G06T 7/0004* (2013.01); *G01N 21/31* (2013.01); *G06T 5/009* (2013.01)

(58) Field of Classification Search
CPC .................................................. G06T 7/0004
USPC ........................................................ 348/131
See application file for complete search history.

(56) References Cited

U.S. PATENT DOCUMENTS

| 2009/0152475 A1* | 6/2009 | Sasaki | G01J 3/10 250/492.1 |
| 2011/0157458 A1* | 6/2011 | Chen | G01J 3/027 348/357 |
| 2012/0069181 A1* | 3/2012 | Xue | G01J 3/447 348/148 |

FOREIGN PATENT DOCUMENTS

| JP | H11-145229 A | 5/1999 |
| JP | 2004-177170 A | 6/2004 |

* cited by examiner

*Primary Examiner* — Jeffery A Williams
(74) *Attorney, Agent, or Firm* — Harness, Dickey & Pierce, P.L.C.

(57) ABSTRACT

A visual inspection device includes a spectroscope that selectively transmits a wavelength of light reflected by a target object, a camera that receives the light transmitted through the spectroscope and captures a spectral image of the target object, and one or a plurality of processors, in which the one or the plurality of processors are programmed to execute a method including: controlling the spectroscope to obtain an inspection wavelength corresponding to the target object, and acquiring, from the camera, the spectral image based on the inspection wavelength, calculating a light intensity change amount that is a difference between a light intensity of each pixel of the spectral image and a predetermined reference value, calculating a parameter indicating variation in the light intensity change amount in a pixel range including a target pixel of the spectral image, and determining whether or not the parameter is within a predetermined range.

5 Claims, 9 Drawing Sheets

VISUAL INSPECTION DEVICE AND VISUAL INSPECTION METHOD

The present application is based on, and claims priority from, JP Application Serial Number 2018-240834, filed Dec. 25, 2018, the disclosure of which is hereby incorporated by reference herein in its entirety.

BACKGROUND

1. Technical Field

The present disclosure relates to a visual inspection device and a visual inspection method.

2. Related Art

In related art, there is a visual inspection assisting device for users to perform visual inspection of a target object. For example, in the visual inspection assisting device (visual inspection device) described in JP-A-11-145229, a polarizing plate is provided in a microscope for observing the target object. By observing the target object through the polarizing plate, an operator can check the presence or absence of a foreign matter based on the contrast difference between the observation images of the target object and the foreign matter attached to the target object.

There is also a method of performing the visual inspection using image recognition technology without requiring the operator's judgment. For example, in the visual inspection method described in JP-A-2004-177170, a foreign matter and the like on the target object is detected based on the luminance distribution of the difference image between the image obtained by imaging the target object and the template image.

However, in the visual inspection device described in JP-A-11-145229, the operator judges the presence or absence of a foreign matter based on the contrast difference of the observation images, but the ability to recognize the contrast difference varies from operator to operator, and it is necessary for the operator to learn skill in order to judge the presence or absence of a foreign matter. Further, the visual inspection method using image recognition technology such as that described in JP-A-2004-177170 and the like does not consider the wavelength component of the light reflected by the target object, and it is difficult to detect a foreign matter with high accuracy.

SUMMARY

A visual inspection device according to an aspect of the present disclosure includes a spectroscope that selectively transmits a wavelength of light reflected by a target object, a camera that receives the light transmitted through the spectroscope and captures a spectral image of the target object, and one or a plurality of processors, in which the one or the plurality of processors are programmed to execute a method including: controlling the spectroscope to obtain an inspection wavelength corresponding to the target object, and acquiring, from the camera, the spectral image based on the inspection wavelength, calculating a light intensity change amount that is a difference between a light intensity of each pixel of the spectral image and a predetermined reference value, calculating a parameter indicating variation in the light intensity change amount in a pixel range including a target pixel of the spectral image, and determining whether or not the parameter is within a predetermined range.

The visual inspection device according to the aspect of the present disclosure may further include a display, in which the one or the plurality of processors may be further programmed to execute the method including generating a luminance image obtained by luminance conversion of the light intensity change amount of the target pixel when it is determined that the parameter is within the predetermined range, and the display may display the luminance image.

In the visual inspection device according to the aspect of the present disclosure, the one or the plurality of processors may be further programmed to execute the method including generating the luminance image by performing enhancement processing and luminance conversion of the light intensity change amount.

In the visual inspection device according to the aspect of the present disclosure, the one or the plurality of processors may be further programmed to execute the method including acquiring spectral measurement information of the target object, and deciding, as the inspection wavelength, a wavelength at which a reflection intensity at the target object is the maximum or minimum based on the spectral measurement information.

The visual inspection device according to the aspect of the present disclosure may further include a light source for irradiating the target object with illumination light, in which the one or the plurality of processors may be further programmed to perform the method including adjusting a wavelength of the illumination light based on the inspection wavelength.

A visual inspection method according to an aspect of the present disclosure includes acquiring a spectral image of a target object captured based on an inspection wavelength corresponding to the target object, calculating a light intensity change amount that is a difference between a light intensity of each pixel of the spectral image and a predetermined reference value, calculating a parameter indicating variation in the light intensity change amount in a pixel range including a target pixel of the spectral image; and determining whether or not the parameter is within a predetermined range.

DESCRIPTION OF EXEMPLARY EMBODIMENTS

First Embodiment

The visual inspection device according to the first embodiment of the present disclosure will be described. In the present embodiment, the visual inspection device is configured as a head mount display.

Schematic Configuration of Visual Inspection Device

Figure 1:
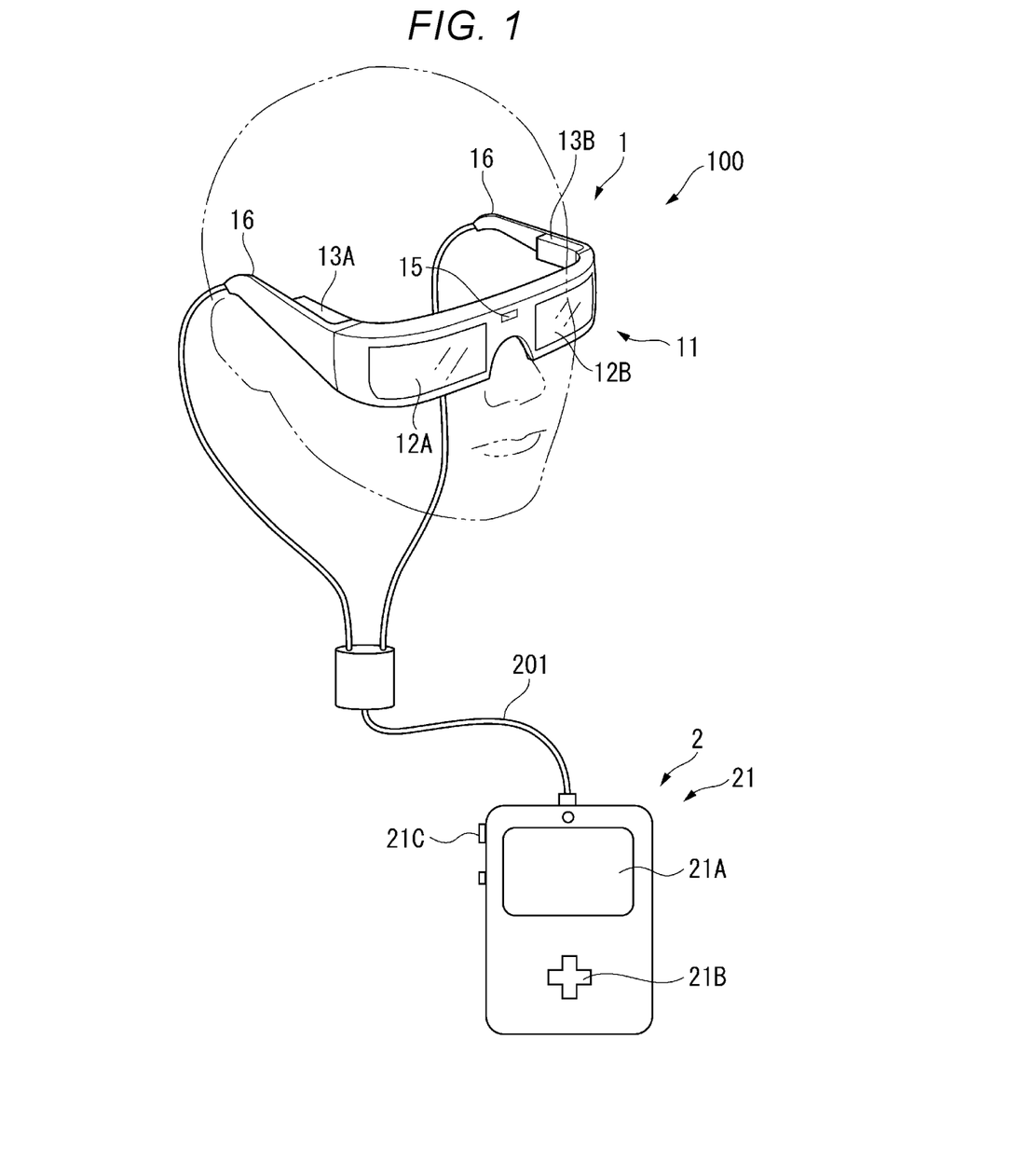
FIG. 1 is a schematic diagram showing a visual inspection device according to a first embodiment of the present disclosure.
Figure 2:
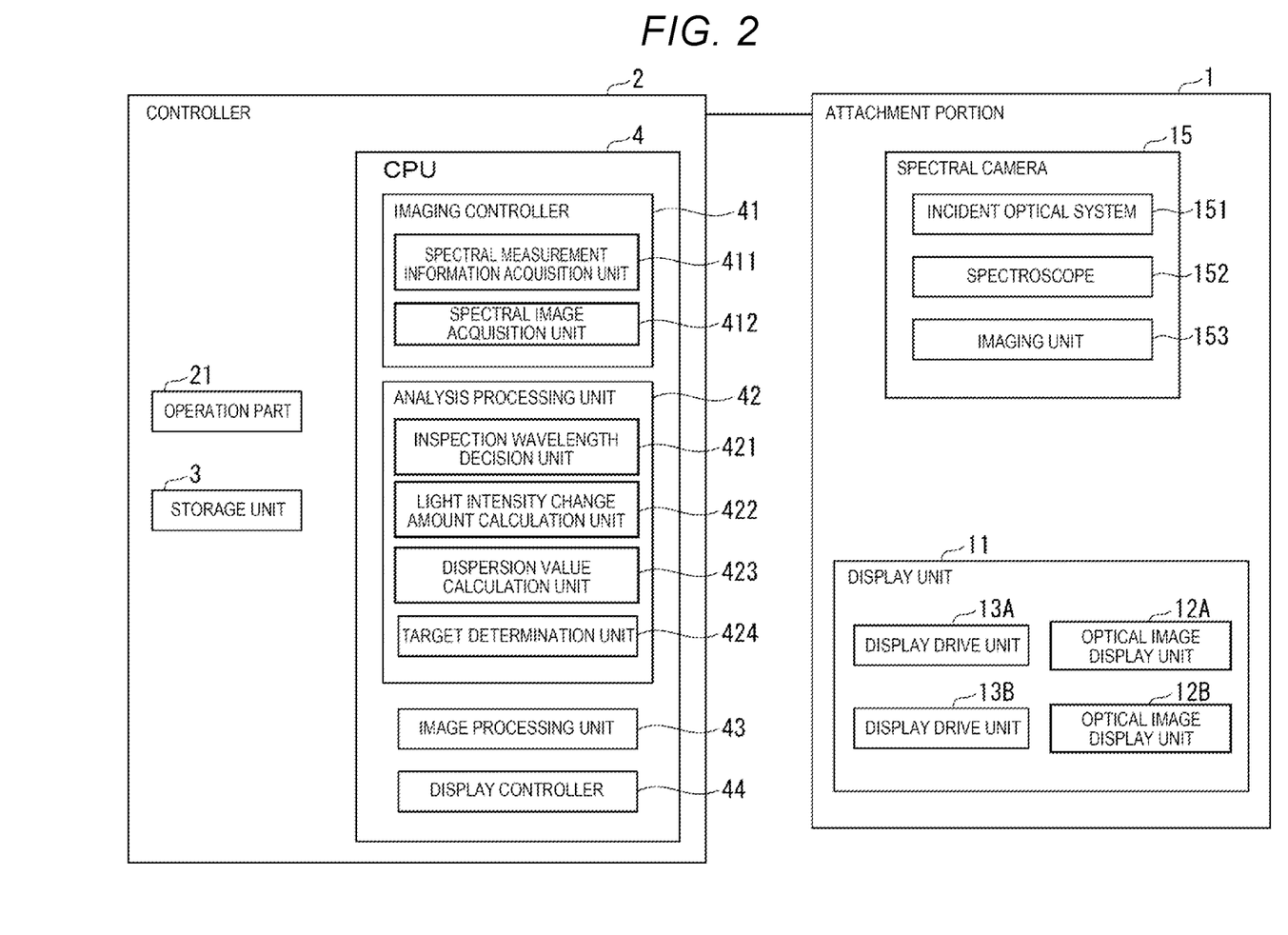
FIG. 2 is a block diagram showing a schematic configuration of the visual inspection device according to the first embodiment.

FIG. 1 is a perspective view showing a visual inspection device 100. FIG. 2 is a block diagram showing a schematic configuration of the visual inspection device 100.

As shown in FIG. 1, the visual inspection device 100 is configured as a head mount display (HMD) that maybe attached to an attachment site such as a user's head.

Specifically, the visual inspection device 100 includes an attachment portion 1 that is attached on the user's head and a controller 2 that controls the attachment portion 1. The attachment portion 1 has a spectacle shape as a whole, and is a see-through type that allows the user to observe the scene of the outside world, and may display a virtual image in front of the user's eyes. When the user observes a target object W with the attachment portion 1 attached, the controller 2 causes the attachment portion 1 to display, as a virtual image, information for assisting the visual inspection of the target object W.

Configuration of Attachment Portion 1

As shown in FIG. 1, the attachment portion 1 includes a display unit 11, a spectral camera 15, a holder 16, and the like.

The display unit 11 includes a pair of left and right optical image display units 12A and 12B, and display drive units 13A and 13B that drive the optical image display units 12A and 12B, respectively.

The optical image display units 12A and 12B are arranged so as to be positioned in front of the right and left eyes of the user when the user wears the attachment portion 1. Each of these optical image display units 12A and 12B includes a light guide plate, and allows the user to observe the outside scene by transmitting external light.

The display drive units 13A and 13B are arranged in the vicinity of the optical image display units 12A and 12B, which are the driving targets, respectively. Although not shown, the display drive units 13A and 13B include a reception unit that receives a signal from the controller 2, a backlight that serves as a light source, a backlight controller, a liquid crystal display (LCD) that serves as a display element, an LCD controller, and a projection optical system that projects image light emitted from the liquid crystal display. In addition, an organic light emitting diode (OLED) panel (organic EL) may be used instead of the liquid crystal display.

In such a display unit 11, the image light emitted from one display drive unit 13A is guided to the right eye of the user through the optical image display unit 12A, and the image light emitted from the other display drive unit 13B is guided to the left eye of the user through the optical image display unit 12B.

Figure 3:
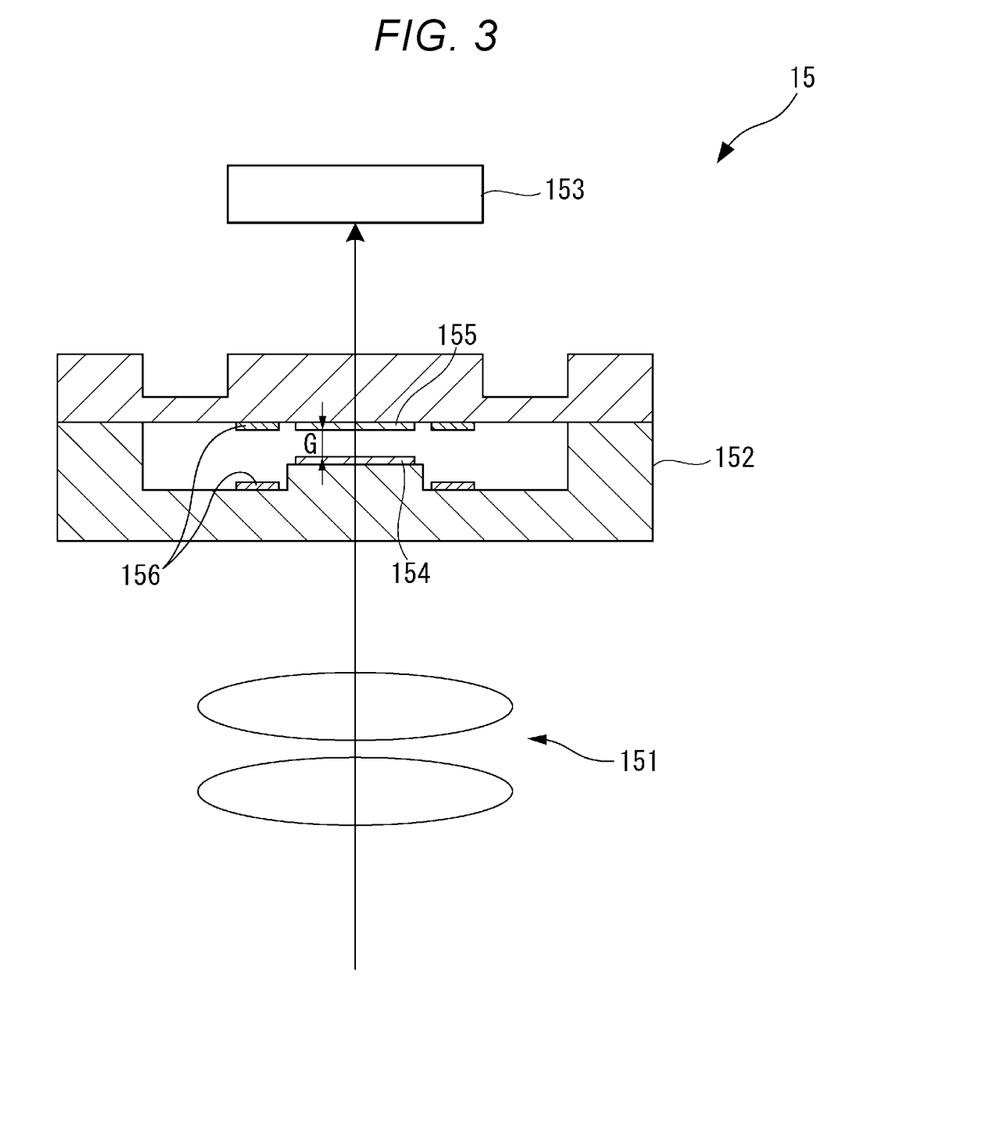
FIG. 3 is a schematic diagram showing a schematic configuration of a spectral camera according to the first embodiment.

FIG. 3 shows the schematic configuration of the spectral camera 15. As shown in FIGS. 2 and 3, the spectral camera 15 includes an incident optical system 151 to which external light is incident, a spectroscope 152 that divides the incident light, and an imaging unit 153 that images the light divided by the spectroscope 152.

The incident optical system 151 is formed of a telecentric optical system and the like, for example, and guides the incident light to the spectroscope 152 so that the optical axis and main light beam are parallel or substantially parallel.

For example, the spectroscope 152 is a variable wavelength interference filter, and includes a pair of reflective films 154 and 155 facing each other with a gap G therebetween, and electrostatic actuators 156 formed by electrodes provided on each reflective film. In this spectroscope 152, voltage applied to the electrostatic actuators 156 is controlled, and the dimension of the gap G between the pair of reflective films 154 and 155 is changed, so that the light with a wavelength corresponding to the dimension is transmitted.

The imaging unit 153 is an image sensor including a plurality of light reception elements and images an image light transmitted through the spectroscope 152. For the imaging unit 153, a CCD or CMOS may be used, for example.

As shown in FIG. 1, the holder 16 is a member that extends to the temporal regions on both sides of the user while holding the optical image display units 12A and 12B in front of the eyes of the user, and has a configuration like a temple of glasses, for example.

Configuration of Controller

As shown in FIG. 1, the controller 2 is connected to the attachment portion 1 through a cord 201 such as a cable or an optical fiber. In this example, the connection using the cord 201 is shown as an example, but wireless connection using a wireless LAN, Bluetooth (registered trademark), and the like may be used.

The controller 2 is a device that controls each component of the attachment portion 1, and includes an operation part 21 including a trackpad 21A, a direction key 21B, a power switch 21C, and the like, for example. The controller 2 includes one or a plurality of processors, and in the present embodiment, as shown in FIG. 2, the controller 2 includes a storage unit 3, one or more memories, one or more CPUs 4, and the like.

The storage unit 3 is formed of ROM, RAM, and the like, and stores various computer programs and various data.

The CPU 4 reads out and executes the computer program stored in the storage unit 3, and serves as an imaging controller 41, an analysis processing unit 42, an image processing unit 43, and a display controller 44, as shown in FIG. 2.

The imaging controller 41 controls the spectral camera 15, and includes a spectral measurement information acquisition unit 411 that acquires spectral measurement information and a spectral image acquisition unit 412 that acquires a spectral image.

The analysis processing unit 42 performs analysis processing based on information (spectral measurement information or spectral image) acquired by the imaging controller 41, and includes an inspection wavelength decision unit 421, a light intensity change amount calculation unit 422, a dispersion value calculation unit 423 (variation calculation unit), and a determination unit 424. Details of each function will be described below.

The image processing unit 43 generates a luminance image based on the analysis processing by the analysis processing unit 42 and the spectral image imaged by the spectral camera 15.

The display controller 44 controls the display drive units 13A and 13B to cause the optical image display units 12A and 12B to display the luminance image generated by the image processing unit 43.

Visual Inspection Method

In the visual inspection method according to the present embodiment, an inspection wavelength decision processing for deciding an inspection wavelength corresponding to the target object W and a virtual image display processing for displaying a virtual image for assisting the visual inspection based on a spectral image of the target object W based on the inspection wavelength are performed. Hereinafter, each processing will be described.

Inspection Wavelength Decision Processing

The inspection wavelength decision processing according to the present embodiment will be described.

Figure 5:
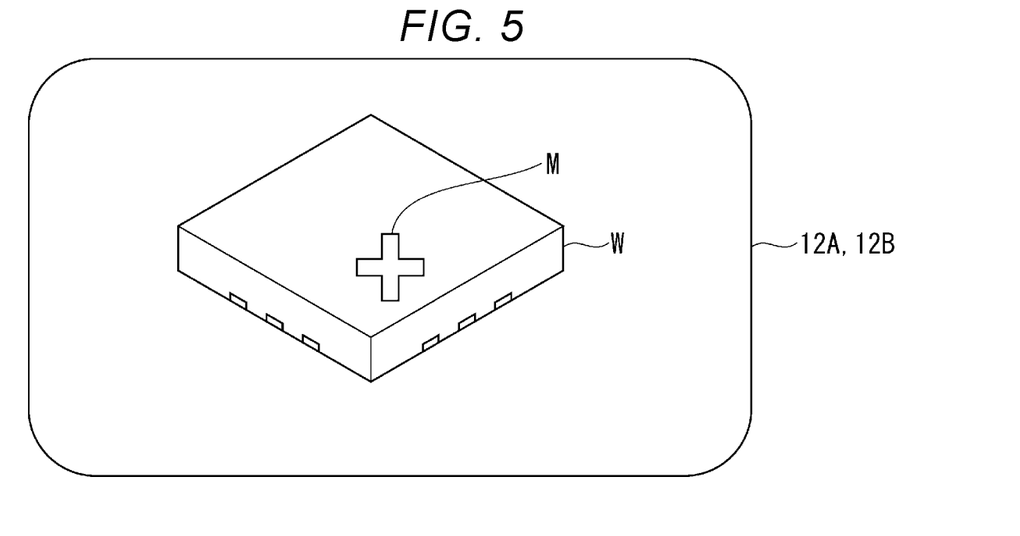
FIG. 5 is a diagram showing an example of a reference mark displayed on an optical image display unit according to the first embodiment.

First, as a preliminary preparation, the user wears the attachment portion 1 and places the target object W in the outside scene to be observed through the optical image display units 12A and 12B. Then, the user operates the operation part 21 to select the inspection wavelength decision mode. As a result, the display controller 44 displays a virtual image of a reference mark M such as a cross on a substantially central portion of the optical image display units 12A and 12B, as shown in FIG. 5, for example. At this time, the reference mark M is displayed to be superimposed on the target object W that is observed through the optical image display units 12A and 12B. In addition, the target object W is in a state of being irradiated with appropriate illumination light.

Figure 4:
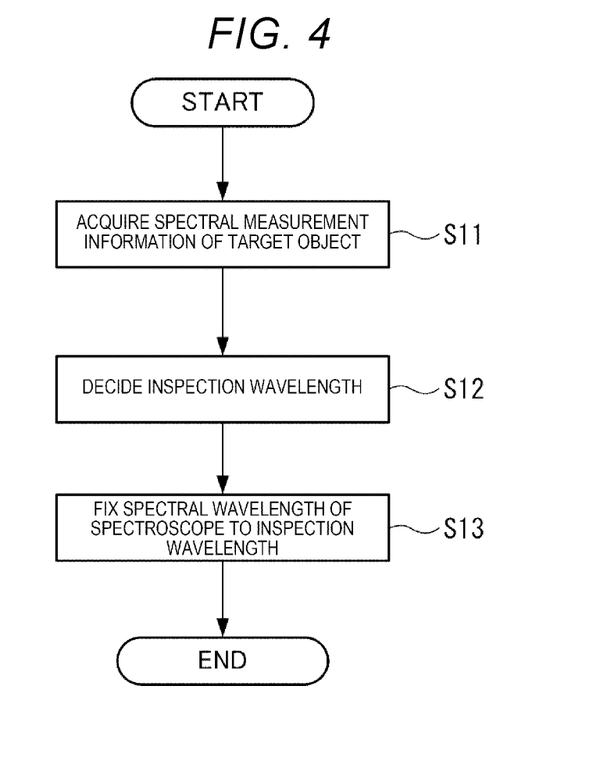
FIG. 4 is a flowchart showing a flow of inspection wavelength decision processing according to the first embodiment.

FIG. 4 shows the flow of the inspection wavelength decision processing at the controller 2.

The spectral measurement information acquisition unit 411 controls the spectral camera 15 to sequentially switch the wavelength transmitted through the spectroscope 152 to N spectral wavelengths $\lambda 1$ to $\lambda N$, and acquires, from the imaging unit 153, a light reception signal based on the incident light from the direction corresponding to the reference mark M (step S11; spectral measurement information acquisition step). Thereby, the spectral measurement information acquisition unit 411 acquires spectral measurement information obtained by measuring the light reflection intensity of the target object W for each of the spectral wavelengths $\lambda 1$ to $\lambda N$. The spectral measurement information is stored in the storage unit 3.

Next, the inspection wavelength decision unit 421 decides the inspection wavelength based on the spectral measurement information acquired in step S11 (step S12; inspection wavelength decision step).

Figure 6:
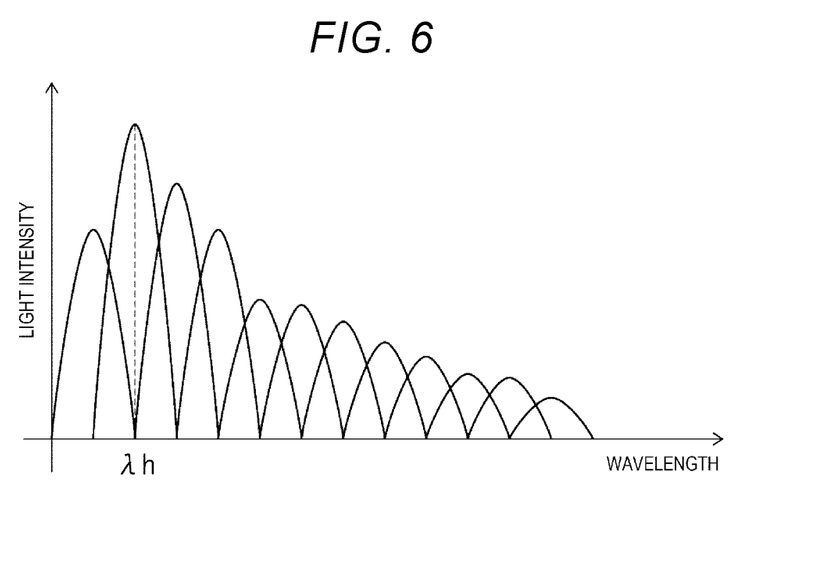
FIG. 6 is a diagram showing an example of spectral measurement information according to the first embodiment.

FIG. 6 is a graph showing an example of spectral measurement information of the target object W. As shown in FIG. 6, the reflection intensity of the target object W is different for each of the spectral wavelengths $\lambda 1$ to $\lambda N$.

In the present embodiment, the inspection wavelength decision unit 421 decides, as the inspection wavelength $\lambda h$, the spectral wavelength indicating the highest peak of the light reflection intensity (light intensity) of the target object W among the spectral wavelengths $\lambda 1$ to $\lambda N$ based on the spectral measurement information. Further, the light intensity at the inspection wavelength $\lambda h$ is stored in the storage unit 3 as the reference value Yt.

Thereafter, the imaging controller 41 fixes the wavelength transmitted through the spectroscope 152 to the inspection wavelength $\lambda h$ decided at step S12. In other words, it is ensured that only the signal of the inspection wavelength $\lambda h$ is received from the spectral camera 15 (step S13).

Thus, the inspection wavelength decision processing is ended.

Visual Inspection Assisting Processing

Next, the visual inspection assisting processing according to the present embodiment will be described.

After the inspection wavelength decision processing described above, the user operates the operation part 21 to select the visual inspection assisting mode. After that, the user conducts a visual inspection of the target object W by observing the target object W through the optical image display units 12A and 12B with the attachment portion 1 attached. Note that the target object W is in a state of being irradiated with appropriate illumination light.

For the duration that the visual inspection assisting mode is selected, the spectral camera 15 images a spectral image of the target object W based on the light with the inspection wavelength $\lambda h$. Here, the spectral camera 15 may be an image imaging mode or a moving image imaging mode. When the spectral camera 15 is in the moving image imaging mode, the frame included in the imaged moving image corresponds to the spectral image according to the present disclosure.

Figure 7:
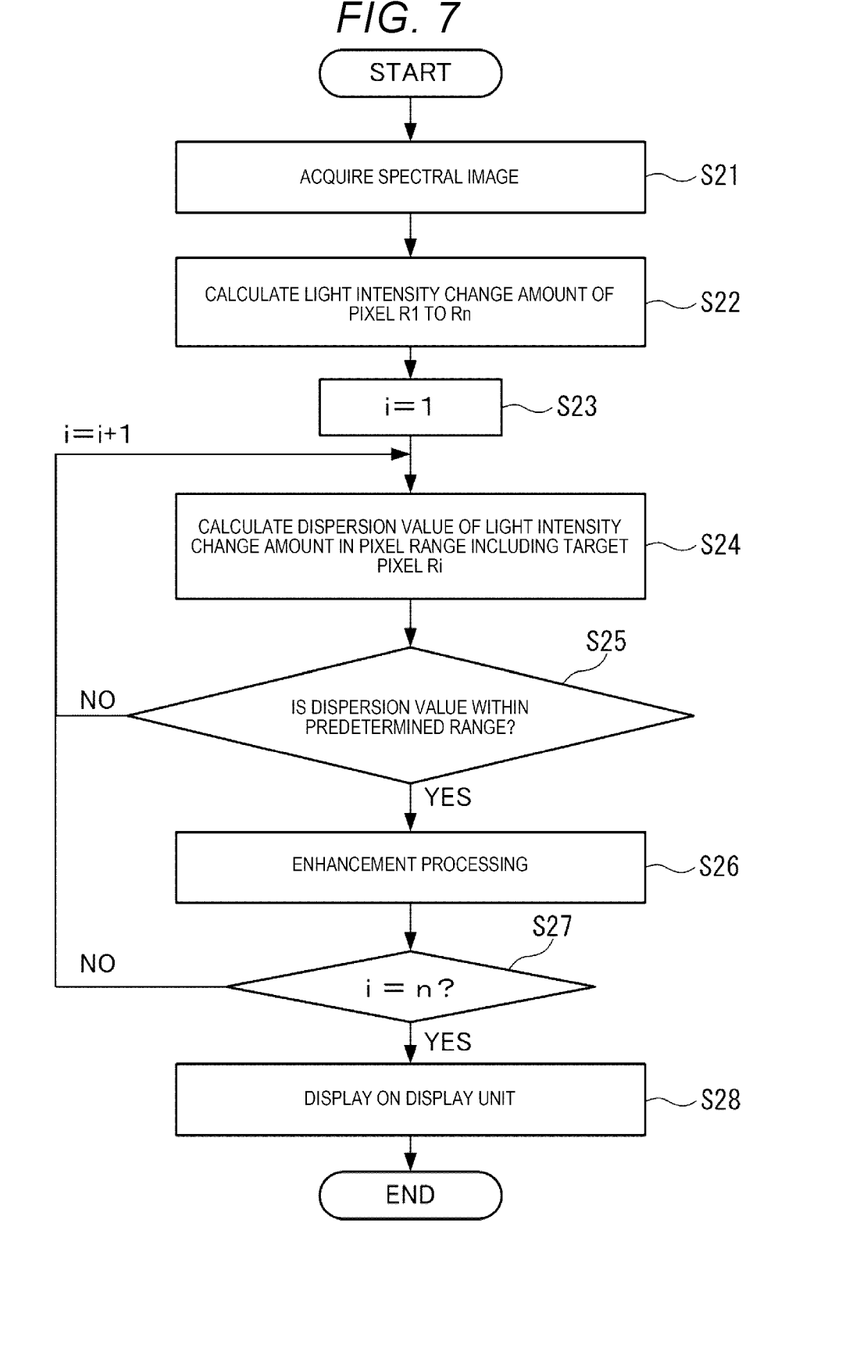
FIG. 7 is a flowchart showing a flow of visual inspection assisting processing according to the first embodiment.

FIG. 7 shows the flow of visual inspection assisting processing at the controller 2.

First, the spectral image acquisition unit 412 acquires a spectral image from the spectral camera 15 (step S21; spectral image acquisition step). Note that the wavelength of the spectral image acquired at step S21 is the inspection wavelength $\lambda h$ fixed at step S13 described above.

The light intensity change amount calculation unit 422 calculates a light intensity change amount $\Delta Y$ that is the difference between the light intensity of each pixel of the acquired spectral image and the reference value Yt (step S22; change amount calculation step).

Next, the dispersion value calculation unit 423 initializes a variable i indicating a pixel (i=1) (step S23), and calculates the dispersion value Di as a parameter indicating the variation of the light intensity change amount $\Delta Y$ in a predetermined pixel range including the target pixel Ri (step S24; variation calculation step).

In the present embodiment, a specified pixel range is a range that includes the target pixel Ri and its surrounding pixels, and the surrounding pixels of the target pixel Ri are four pixels on the upper, lower, left, and right adjacent to the target pixel Ri, for example.

Note that the surrounding pixels of the target pixel Ri are not limited to the four pixels on the upper, lower, left and right adjacent to the target pixel Ri, and may be optionally selected from those around the target pixel Ri. In addition, when the target pixel Ri corresponds to a corner or a side of the spectral image, the surrounding pixels maybe two or three pixels adjacent to the target pixel Ri.

Further, the method of calculating the dispersion value Di of the light intensity change amount ΔY in a predetermined pixel range is the same as the general method of calculating the dispersion value, and the greater the degree of variation in the light intensity change amount ΔY, the greater the calculated dispersion value Di.

Next, the determination unit 424 determines whether or not the dispersion value Di is within a predetermined range that is equal to or greater than a first threshold value Dt1, and equal to or less than a second threshold value Dt2 (step S25; determination step).

Here, when the target pixel Ri corresponds to an inner position of the target object W, in other words, when the target pixel Ri does not correspond to a boundary portion between the target object W and the background, the light intensity change amount ΔY of the surrounding pixels of the target pixel Ri is, for example, a value in the range of −20% to 20% of the reference value Yt, even when a foreign matter is present. In consideration of this, when the target pixel Ri corresponds to the boundary portion of the target object W, the second threshold value Dt2 is set so that the dispersion value Di is greater than the second threshold value Dt2.

In addition, when the target pixel Ri corresponds to the inner position of the target object W and there is no abnormality in the region of the target object W corresponding to the target pixel Ri and its surrounding pixels, the light intensity change amount ΔY of the target pixel Ri is, for example, a value in the range of −5% to 5% of the reference value Yt. Therefore, when there is no abnormality in the region of the target object W corresponding to the target pixel Ri and its surrounding pixels, the first threshold value Dt1 is set so that the dispersion value Di is smaller than the first threshold value Dt1.

Figure 8:
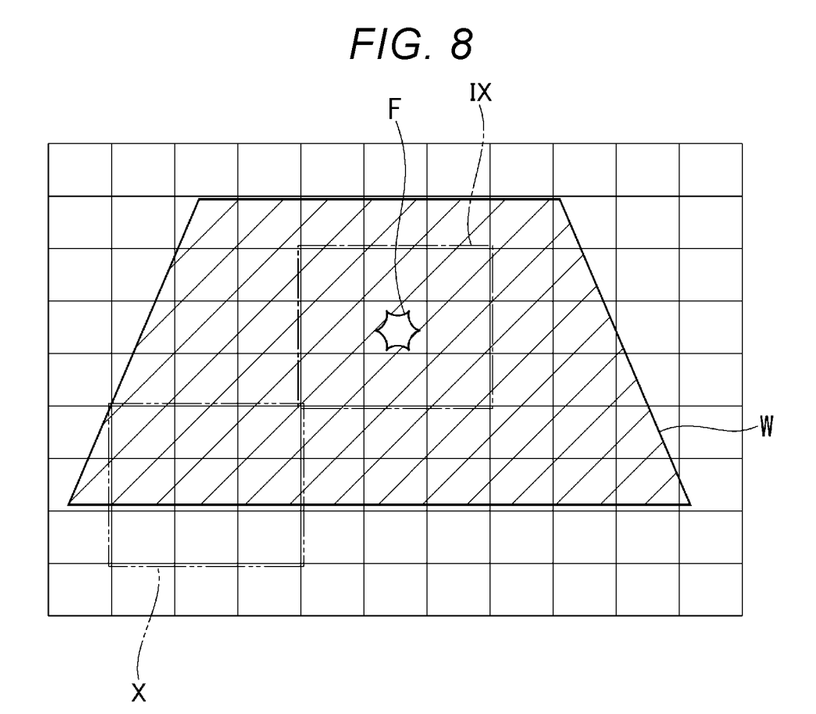
FIG. 8 is a diagram showing an example of a spectral image according to the first embodiment.

For example, FIG. 8 is a diagram showing an example of a spectral image obtained by imaging the target object W. In addition, FIG. 9 is an enlarged view showing the IX portion of the spectral image shown in FIG. 8, and FIG. 10 is an enlarged view showing the X portion of the spectral image shown in FIG. 8.

Figure 9:
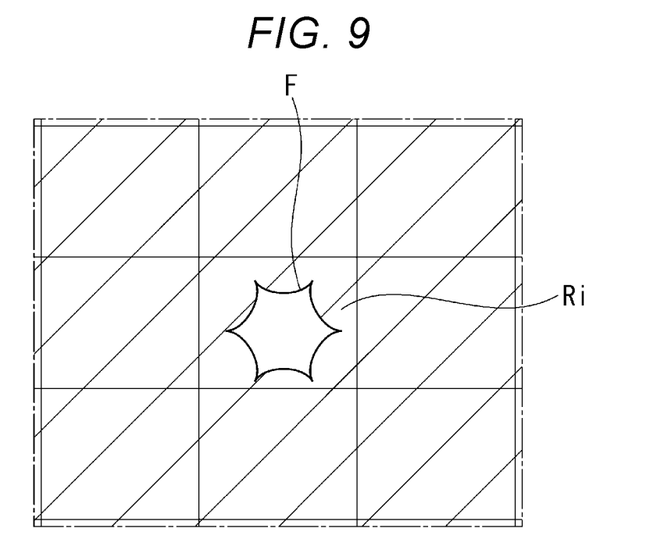
FIG. 9 is an enlarged view showing the IX part of FIG. 8.

FIG. 9 shows an example in which the target pixel Ri corresponds to the inner region of the target object W. The dispersion value Di of the light intensity change amount ΔY calculated in such an example is equal to or less than the second threshold value Dt2. Furthermore, when an abnormality F such as a scratch or a foreign matter is present in the region of the target object W corresponding to the target pixel Ri, the dispersion value Di is equal to or greater than the first threshold value Dt1.

Figure 10:
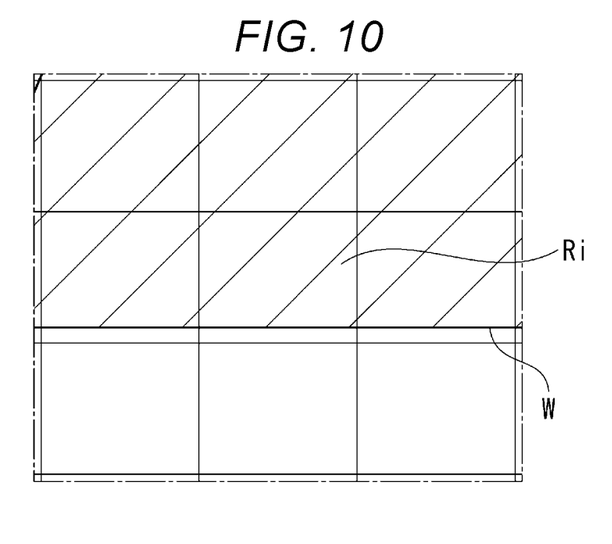
FIG. 10 is an enlarged view showing the X part in FIG. 8.

FIG. 10 shows an example in which the target pixel Ri corresponds to a boundary portion between the target object W and the background. The dispersion value Di of the light intensity change amount ΔY calculated in such an example is greater than the second threshold value Dt2.

When it is determined at step S25 that the dispersion value Di is within the predetermined range, the image processing unit 43 enhances the light intensity change amount ΔY of the target pixel Ri and converts it to the luminance of the target pixel Ri (step S26; image processing step).

Figure 11:
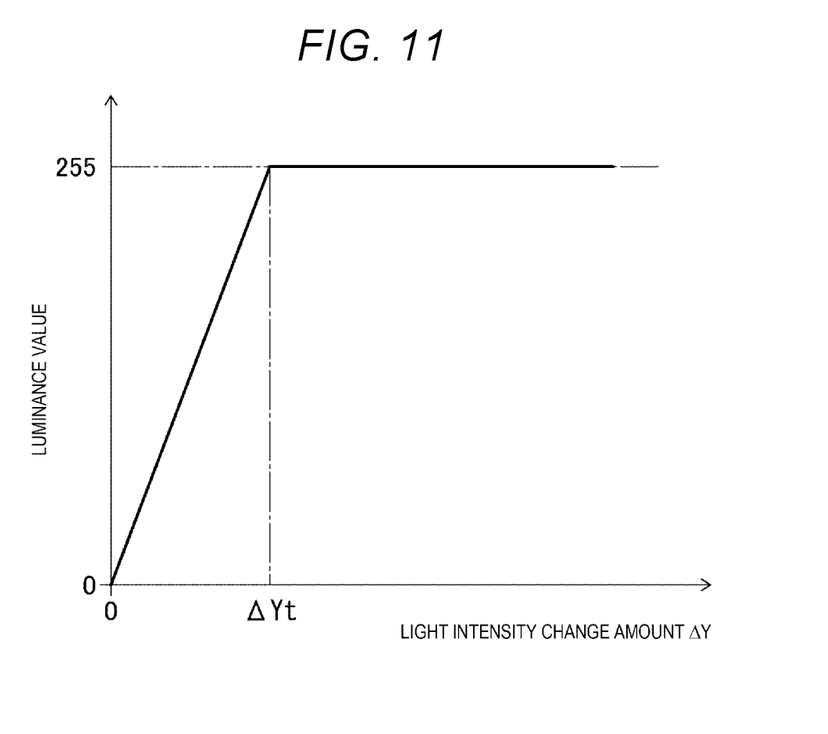
FIG. 11 is a graph for explaining enhancement processing according to the first embodiment.

In this example, in the enhancement processing according to the present embodiment, a linear enhancement processing as shown in FIG. 11 is performed. In this linear enhancement processing, regarding the relationship between the absolute value of the light intensity change amount ΔY and the luminance, the luminance when the absolute value of the light intensity change amount ΔY is 0 is set to a minimum value (for example, 0), and the luminance when the absolute value of the light intensity change amount ΔY is a predetermined value ΔYt is set to a maximum value (for example, 255), and a range of the absolute value of the light intensity change amount ΔY between 0 and the predetermined value ΔYt is set in a linear relationship.

In this example, the predetermined value ΔYt may be set optionally, but it is preferable to set it within a range of 5% to 20% of the reference value Yt, for example.

In addition, the luminance converted at step S25 may be set not only to the luminance of the target pixel Ri, but also to the luminance of the surrounding pixels of the target pixel Ri.

Meanwhile, when it is determined at step S25 that the dispersion value Di is outside the predetermined range, "1" is added to the variable i without converting the light intensity change amount ΔY of the target pixel Ri into luminance, and the processing is returned to step S24.

Next, the image processing unit 43 determines whether or not the variable i reaches N (step S27). When it is determined No at step S27, "1" is added to the variable i and the processing is returned to step S24.

Meanwhile, when it is determined Yes at step S27, the generation of the luminance image based on one spectral image is completed. In this luminance image, pixels with a high possibility that an abnormality is present have a high luminance. In this case, the display controller 44 causes the display unit 11 to display the generated luminance image (step S28; display step).

Thus, the visual inspection assisting processing with respect to spectral images is ended. According to such processing, when the light intensity changes in any pixel of the spectral image, even when the light intensity change amount ΔY is a slight amount, it is displayed on the display unit 11 as a glow. When recognizing the glow displayed on the display unit 11, the operator may examine the target object W and finally check whether there is an abnormality in the target object W.

The visual inspection assisting processing described above is performed every time the spectral image acquisition unit 412 acquires a spectral image.

In addition, in the above visual inspection assisting processing, when the spectral camera 15 images an image of the target object W in the moving image mode, the user preferably performs operations such as rotating the target object W at the same position to change the imaging angle of the target object W.

Effect of First Embodiment

The visual inspection device 100 according to the present embodiment includes the spectroscope 152 that selectively transmits a wavelength of light reflected by the target object W, the imaging unit 153 that receives the light transmitted through the spectroscope 152 and images a spectral image of the target object W, and the display unit 11. The controller 2 serves as the spectral image acquisition unit 412 that controls the wavelength transmitted by the spectroscope 152 to the inspection wavelength λh and acquires a spectral image corresponding to the inspection wavelength λh from the imaging unit 153, the light intensity change amount calculation unit 422 that calculates a light intensity change amount ΔY that is a difference between a light intensity of each pixel of the spectral image and the reference value Yt, the dispersion value calculation unit 423 that calculates the dispersion value Di of the light intensity change amount ΔY in the pixel range including the target pixel Ri of the spectral image, and the determination unit 424 that determines whether or not the dispersion value Di is within a predetermined range.

In such an embodiment, by determining whether or not the dispersion value Di of the light intensity change amount ΔY in the predetermined pixel range is within the predetermined range, it is possible to determine whether or not there is a high possibility that a foreign matter is present in the target object W. In this example, the light intensity change amount ΔY is calculated using the spectral image with the inspection wavelength λh corresponding to the target object W. For this reason, it is possible to make a highly accurate determination compared to the case in which the light intensity change amount ΔY is calculated using an image in any wavelength range.

In the present embodiment, the operator may recognize that the target object W of which dispersion value Di is determined to be within the predetermined range by the determination unit 424 is the target object W with a high possibility that a foreign matter is present, to thus perform a foreign matter judgment.

Therefore, according to the present embodiment, it is possible to provide the visual inspection device 100 that may detect a foreign matter with high accuracy without requiring the operator's skill.

In the present embodiment, image processing is performed with respect to spectral images, so that there is an effect that the amount of data to be handled is reduced, and the processing speed is improved compared to the case in which image processing is performed with respect to an image in any wavelength range.

In the present embodiment, when the dispersion value Di is determined to be within the predetermined range, the controller 2 further serves as the image processing unit 43 that generates a luminance image obtained by converting the light intensity change amount ΔY of the target pixel Ri into luminance. The image processing unit 43 generates a luminance image by enhancing the light intensity change amount ΔY and converting into the luminance. The luminance image generated in this way is displayed on the display unit 11.

In the present embodiment, the operator may easily notice the possibility of a foreign matter by checking the display unit 11 on which the luminance image is displayed and judging the presence or absence of glow.

In addition, since the luminance image is obtained by enhancing the light intensity change amount ΔY, it may be converted to high luminance (glow) even when the light intensity change amount ΔY is a slight amount. For this reason, the operator can more easily notice the possibility of a foreign matter.

In the present embodiment, the controller 2 further serves as the spectral measurement information acquisition unit 411 that acquires spectral measurement information of the target object W and the inspection wavelength decision unit 421 that decides, as the inspection wavelength λh, a wavelength at which the reflection intensity at the target object W is maximum based on the spectral measurement information.

In the present embodiment, the inspection wavelength λh corresponding to the target object W may be appropriately decided.

In addition, according to the visual inspection method according to the present embodiment, the foreign matter may be detected with high accuracy without requiring for the operator to learn skill, like the effect of the visual inspection device 100 described above.

Second Embodiment

Figure 12:
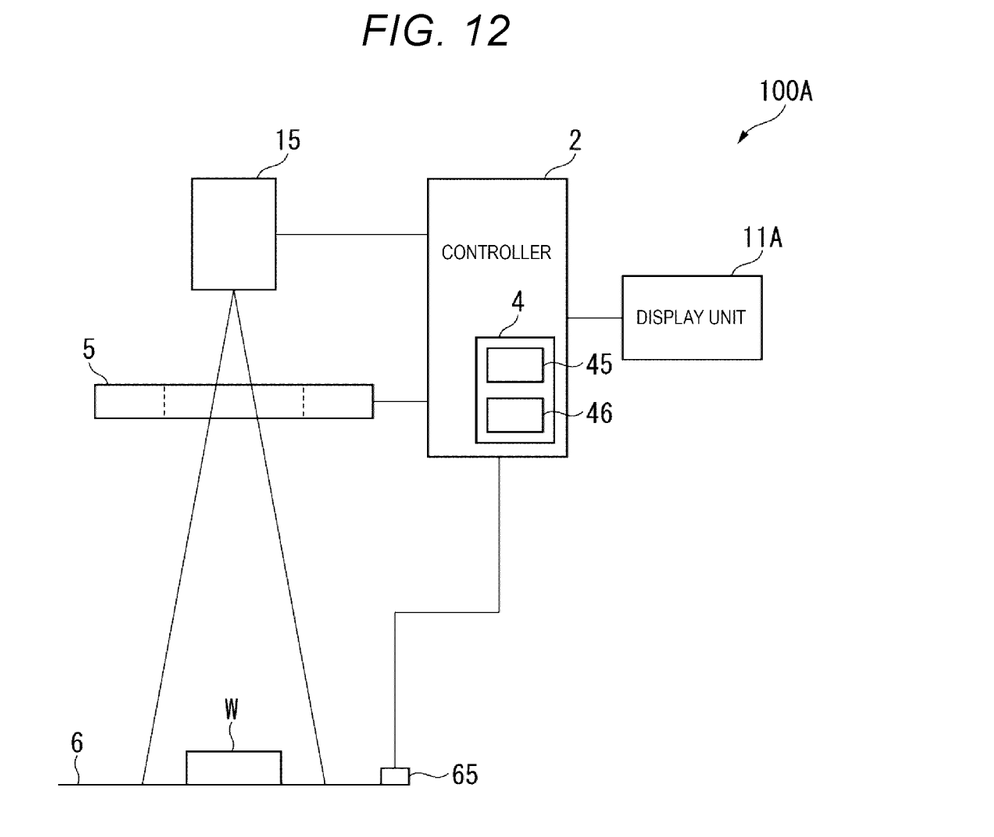
FIG. 12 is a block diagram showing a schematic configuration of the visual inspection device according to a second embodiment.

The visual inspection device 100 according to the first embodiment described above is configured as a head mount display. Meanwhile, the visual inspection device 100A according to the second embodiment is configured as an installation type device as shown in FIG. 12, and the target object W is disposed on a belt conveyor 6.

In the following description, the same reference numerals are given to the same components as those of the first embodiment, and the explanation thereof will be simplified or not be repeated.

In the visual inspection device 100A, the display unit 11A and the spectral camera 15 are formed separately from each other, and a general display device may be used as the display unit 11A. Like the first embodiment, the display unit 11A is controlled by the display controller 44 and displays a spectral image and the like subjected to image processing on the image processing unit 43.

The visual inspection device 100A further includes an illumination unit 5 that irradiates the target object W with illumination light. The illumination unit 5 is ring illumination, for example. In addition, the illumination unit 5 is formed of a plurality of LEDs and the like, and may emit illumination light of a desired wavelength.

In addition, the visual inspection device 100A further includes a sorting mechanism 65 that sorts the target object W on the belt conveyor 6. The structure of the sorting mechanism 65 may use related technology, and has a structure in which the target object W on the belt conveyor 6 is sorted into different locations depending on the possibility of an abnormality.

In the controller 2, in addition to serving as each unit described in the first embodiment, the CPU 4 may also serve as an illumination wavelength controller 45 that controls the illumination unit 5 to adjust the wavelength of the illumination light, and a sorting mechanism controller 46 that controls the sorting mechanism 65.

In the second embodiment, the visual inspection method using the visual inspection device 100A is substantially the same as that described in the first embodiment.

However, in the second embodiment, after step S12, the illumination wavelength controller 45 adjusts the wavelength of the illumination light emitted from the illumination unit 5 based on the inspection wavelength λh. As a result, the illumination light with the inspection wavelength λh is irradiated onto the target object W during the visual inspection assisting processing.

In addition, after step S27, the sorting mechanism controller 46 controls the sorting mechanism 65 so as to sort, as the target object W having the possibility of an abnormality, the target object W of which the dispersion value Di is determined to be within the predetermined range with respect to certain target pixel Ri of the spectral image.

Effect of Second Embodiment

In the second embodiment, the same effects as in the first embodiment described above can be achieved.

In addition, in the second embodiment, the wavelength of the illumination light emitted from the illumination unit 5 is adjusted to the inspection wavelength λh. For this reason, the difference in luminance that occurs in the luminance image due to the presence or absence of an abnormality in the target object W can be further increased. Therefore, the operator can more easily notice the foreign matter.

In addition, since the target object W is sorted according to the possibility of an abnormality, the efficiency of the final abnormality judgment work by the operator can be improved.

MODIFICATION EXAMPLE

It is to be noted that the present disclosure is not limited to the embodiments described above, but modifications and improvements within the scope of achieving the object of the present disclosure are included in the present disclosure.

Modification Example 1

In each of the above embodiments, the CPU 4 serves as the spectral measurement information acquisition unit 411 and the inspection wavelength decision unit 421, but they may not be adapted. For example, when the inspection wavelength data with respect to the target object W is already present in the storage unit 3 and the like, the data is used, and thus, the inspection wavelength decision processing may not be performed.

Modification Example 2

In each of the above embodiments, the light intensity of the inspection wavelength $\lambda h$ stored in the inspection wavelength decision processing is used as the reference value Yt for calculating the light intensity change amount $\Delta Y$, but the present disclosure is not limited thereto, and a preset value may be used.

Modification Example 3

In each of the above embodiments, the determination unit 424 may determine the possibility that an abnormality is present in the target object W based on the spectral image, but the final foreign matter judgment is performed by the operator. However, the determination unit 424 performs machine learning, so that the accuracy of the foreign matter judgment by the determination unit 424 may be increased.

For example, for each target object W, the result of final foreign matter judgment (good or bad) by the operator and all the calculated dispersion values Di are stored in the storage unit 3 in association with each other. Then, the machine learning is performed based on the information stored in the storage unit 3, and a model that inputs the dispersion value Di and outputs good or bad result of the target object W is generated. The determination unit 424 may perform the foreign matter judgment with respect to the target object W by using such a model.

Modification Example 4

In each of the above embodiments, the spectral wavelength at which the reflection intensity (light intensity) of the target object W is maximum is decided as the inspection wavelength $\lambda h$ based on the spectral measurement information, but the present disclosure is not limited thereto. In other words, the inspection wavelength is preferably a wavelength selected according to the color or surface property of the target object W, assumed types of foreign matter for the target object W, or the like, and is preferably a wavelength at which the difference in light intensity change amount $\Delta Y$ due to the presence or absence of a foreign matter in the target object W is greater than other wavelengths, for example.

For example, the wavelength may be differently used, by deciding, as the inspection wavelength, the spectral wavelength that maximizes the light intensity in order to detect scratches (irregularities) on the target object W, and deciding, as the inspection wavelength, the spectral wavelength at which the light intensity is minimum in order to detect the foreign matter adhering to the target object W, and the like.

Modification Example 5

In each of the embodiments described above, when there is the target pixel Ri of which the dispersion value Di is within the predetermined range, the image processing unit 43 generates a luminance image based on the light intensity change amount $\Delta Y$ of the target pixel Ri, but the present disclosure is not limited thereto. For example, when there is the target pixel Ri of which the dispersion value Di is within the predetermined range, the image processing unit 43 may generate an alert image indicating that the target object W has an abnormality. In this case, the display controller 44 may display the alert image at any position on the display unit 11 or 11A, such as, in the vicinity of the target pixel Ri.

Modification Example 6

The "parameter indicating variation" in the present disclosure is not limited to the dispersion value, and may be a standard deviation, for example. For example, in each of the embodiments described above, the CPU 4 may serve as a standard deviation calculation unit instead of the dispersion value calculation unit 423.

Modification Example 7

The first embodiment and the second embodiment may be implemented in combination. For example, in the first embodiment, each element described in the second embodiment may be incorporated.

What is claimed is:
1. A visual inspection device comprising:
a display;
a spectroscope that selectively transmits a wavelength of light reflected by a target object;
a camera that receives the light transmitted through the spectroscope and captures a spectral image of the target object; and
one or a plurality of processors, the one or the plurality of processors being configured to execute a program stored in a memory so as to:
control the spectroscope to obtain an inspection wavelength corresponding to the target object, and acquire, from the camera, the spectral image based on the inspection wavelength;
calculate a light intensity change amount that is a difference between a light intensity of each pixel of the spectral image and a predetermined reference value;
calculate a parameter indicating variation in the light intensity change amount in a pixel range including a target pixel of the spectral image;
determine whether or not the parameter is within a predetermined range;
generate a luminance image obtained by luminance conversion of the light intensity change amount of the target pixel when the one or the plurality of processors is configured to determine that the parameter is within the predetermined range; and
display the luminance image on the display.
2. The visual inspection device according to claim 1,
wherein the one or the plurality of processors is configured to generate the luminance image by performing enhancement processing and the luminance conversion of the light intensity change amount.

3. The visual inspection device according to claim 1, wherein the one or the plurality of processors is further configured to:
   acquire spectral measurement information of the target object; and
   decide, as the inspection wavelength, a wavelength at which a reflection intensity at the target object is the maximum or minimum based on the spectral measurement information.

4. The visual inspection device according to claim 1, further comprising:
   a light source configured to irradiate the target object with illumination light,
   wherein the one or the plurality of processors is configured to adjust a wavelength of the illumination light based on the inspection wavelength.

5. A visual inspection method for causing a processor to execute a program stored in a memory, the method comprising executing on the processor the steps of:
   determining an inspection wavelength of light that is reflected by a target object, the inspection wavelength corresponding to the target object;
   receiving the light having the inspection wavelength so as to acquire a spectral image of the target object;
   calculating a light intensity change amount that is a difference between a light intensity of each pixel of the spectral image and a predetermined reference value;
   calculating a parameter indicating variation in the light intensity change amount in a pixel range including a target pixel of the spectral image;
   determining whether or not the parameter is within a predetermined range;
   generate a luminance image obtained by luminance conversion of the light intensity change amount of the target pixel when the one or the plurality of processors is configured to determine that the parameter is within the predetermined range; and
   display the luminance image on a display.

* * * * *